April 25, 1967

P. M. HAYDEN 3,315,464

HEAT-EXCHANGE SYSTEM

Filed July 6, 1961

INVENTOR.
Perez M. Hayden
BY
Bacon & Thomas
ATTORNEYS

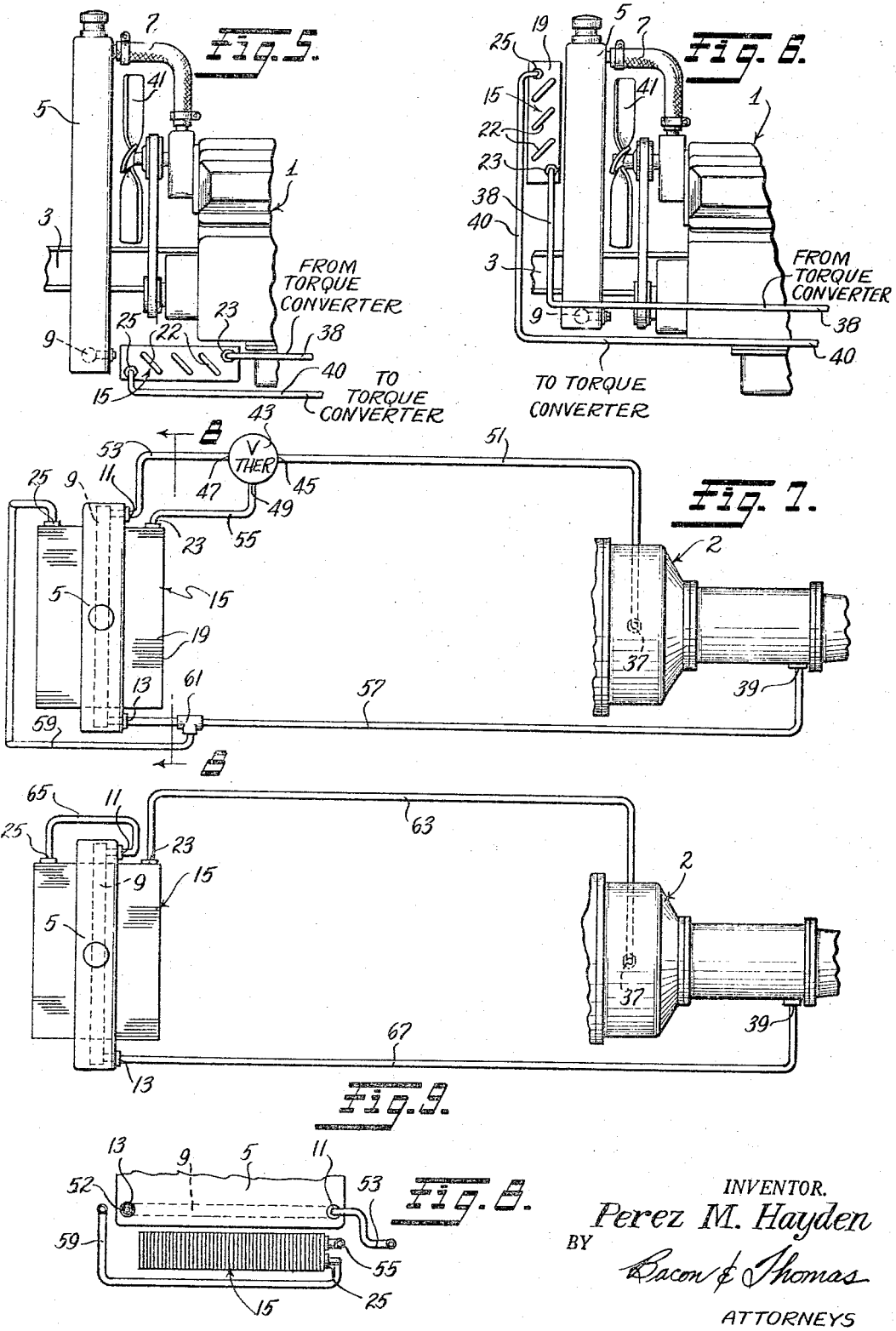

United States Patent Office 3,315,464
Patented Apr. 25, 1967

3,315,464
HEAT-EXCHANGE SYSTEM
Perez M. Hayden, 5596 Jurupa Ave.,
Riverside, Calif. 92504
Filed July 6, 1961, Ser. No. 122,212
7 Claims. (Cl. 60—12)

This invention relates to a heat-exchange system and more particularly to improvements in heat-exchange systems for cooling the oil employed in connection with the operation of mechanisms such as automatic transmissions, torque converters, hydraulic clutches, engines, motors, pumps and the like.

In the past, it has been the conventional practice to cool the oil employed in connection with the operation of an internal combustion engine by passing the oil through a conduit or tube positioned in the lower portion of the water cooling radiator. As this conduit is in heat-exchange relationship with the water in the radiator, it is expected that the water will cool the oil, as well as the engine, in the event that the oil becomes heated to a higher temperature than the water. Most of the present-day internal combustion engines are adapted to operate most efficiently with the temperature of the water, or other liquid employed as a coolant, in the range of 160 to 200 degrees Fahrenheit. The oil employed in various mechanisms driven by or associated with the operation of an internal combustion engine, such as a torque converter, often attains a temperature much higher than the range within which the engine operates most efficiently. When this situation occurs, heat is transferred from the oil in the conduit in the bottom of the radiator, through the wall thereof, to the liquid in the radiator. As a result, neither the torque converter oil nor the engine coolant is adequately cooled.

The radiator normally employed for cooling the engine is of sufficient capacity to perform this function but, even when it is of extra large capacity, the radiator cannot always cool both the engine and the torque converter oil. The hot engine coolant enters the radiator at the top thereof and is cooled during its passage to the bottom of the radiator. The cooled coolant is then returned to the engine to circulate therethrough as controlled by the thermostat and pump normally employed. When driving under adverse conditions, such as in extremely hot weather or in mountain or hilly areas with a vehicle pulling a heavy load up a long, steep incline, the temperature of the oil in a torque converter or an automatic transmission often becomes much hotter than the temperature of the coolant in the radiator. It will be seen that the hot oil passing through the bottom portion of the radiator in heat-exchange relationship with the engine coolant, will heat the coolant which is about to be returned to the engine. Often the hot oil transfers as much or more heat to the coolant than was removed during the passage of the coolant from the top to the bottom of the radiator. The heat transferred to the coolant in the radiator from the hot oil, in addition to that provided by the engine may cause the coolant to be heated to such a high temperature that it boils or the engine becomes inoperative due to preignition. At such a time, operation of the engine must be discontinued until the temperature of the coolant has dropped to below the boiling point or until the temperature is low enough to permit the engine to be operated again.

The coolant normally employed in the radiator of an internal combustion engine is water which boils at sea level at approximately 212 degrees Fahrenheit in an open system or slightly higher in a closed, pressurized system. Water is ordinarily a satisfactory coolant as the efficient range of operating temperatures for internal combusion engines is relatively low and usually below the boiling point of water. It has been shown that the combustion of the liquid fuels employed to operate conventional internal combusion engine cannot be controlled when the engine is operated at a much higher temperature than the boiling point of water. Above this temperature, the fuel tends to ignite by spontaneous combusion before the fuel charge can be properly compressed and therefore the timing of the ignition of the fuel charge cannot be controlled to provide combustion at the desired time. When precombustion takes place before the piston reaches approximately the top of the stroke, engine noise known as spark knock results. Also, excessively high temperatures will often cause the engine to cease functioning altogether because combustion occurs immdiately upon delivery of the fuel charge to the cylinder, before the piston can compress the charge.

The conventional manner of cooling the oil is found to be unsatisfactory due primarily to the fact that an efficient and practical system is not provided. It is evident that, by locating the heat-exchange tube for cooling the oil in the bottom of the radiator, an additional load is placed on the cooling system intended for cooling the engine. In addition, the heat exchange tube or other heat exchanger employed in the past for cooling the oil is not of sufficient capacity or efficiency to adequately cool the oil under certain conditions. Many other systems have been tried, utilizing a variety of types of heat-exchange elements, but none has been found to provide results which are even remotely satisfactory.

It is, therefore, an object of this invention to provide for adequately cooling the oil employed in connection with the operation of mechanical devices.

Another object of this invention is to provide for cooling the oil employed in connection with the operation of mechanical devices without affecting the operation of other cooling means associated therewith.

Another object is to provide an efficient heat exchanger in an improved system for cooling the oil employed in connection with the operation of internal combustion engines.

Another object is to provide a system for cooling oil which may be combined with the engine cooling system, either as an original installation or as a later modification thereof.

Another object is to provide a system for cooling oil which may be either independent of or combined with the engine cooling system.

These and other objects and advantages of the invention will become more apparent from the following description when taken in conjunction with the drawings in which:

FIG. 5 is a fragmentary side elevational view of the engine of FIG. 1 with the heat exchanger for the oil positioned to the rear of the engine radiator;

FIG. 6 is a fragmentary side elevational view of the engine of FIG. 1 with the heat exchanger for the oil positioned in front of the engine radiator;

FIG. 7 is a diagrammatic view of a modified form of the heat exchange system shown in FIG. 1;

FIG. 8 is a view taken on line 8—8 of FIG. 7; and

FIG. 9 is a diagrammatic view similar to FIG. 7, showing a further modified form of the invention shown in FIG. 1.

Figure 1:
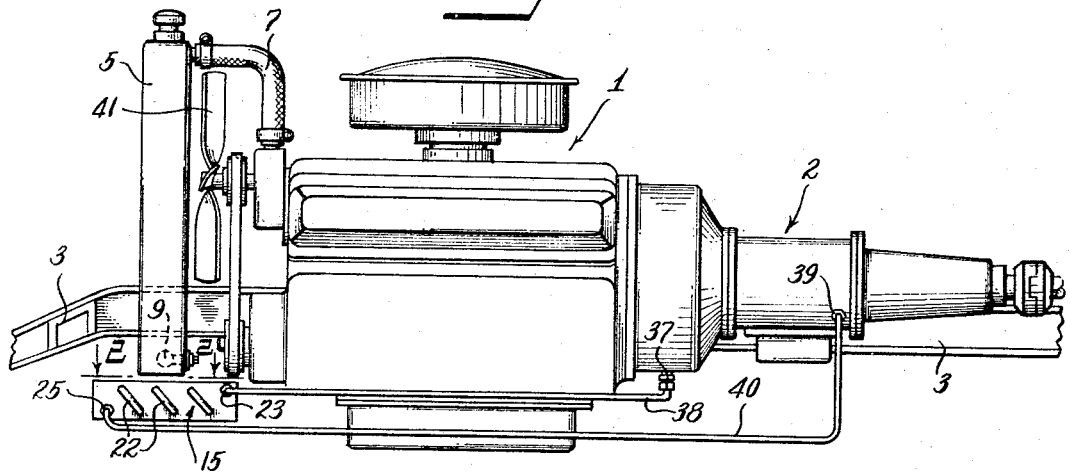
FIG. 1 is a side elevational view of an internal combustion engine and torque converter mounted in a vehicle frame with separate heat exchangers for the engine coolant and for the oil employed in the torque converter.

A specific embodiment of this invention, as disclosed in FIGS. 1–4 of the drawings for the purpose of illustration, provides for cooling the oil in a torque converter which is driven by an internal combustion engine. The internal combustion engine 1 is operably connected to a torque converter 2 by means of which a vehicle or other mechanically operated device may be driven at the desired speed. The engine 1 and torque converter 2 may be mounted on a vehicle frame 3 in the conventional manner or, if desired, they may be mounted on other movable or stationary type supports.

A radiator 5, for cooling the engine 1, is connected at its upper end by means of a hose 7 to the outlet of the coolant chamber for the engine, and at its lower end it is connected by means of another hose (not shown) to the inlet of the coolant chamber for the engine. A heat exchange conduit or tube 9, for cooling the oil in torque converter 2, is disposed in the bottom of radiator 5 in heat exchange relation with the coolant normally employed in the radiator.

Figure 2:
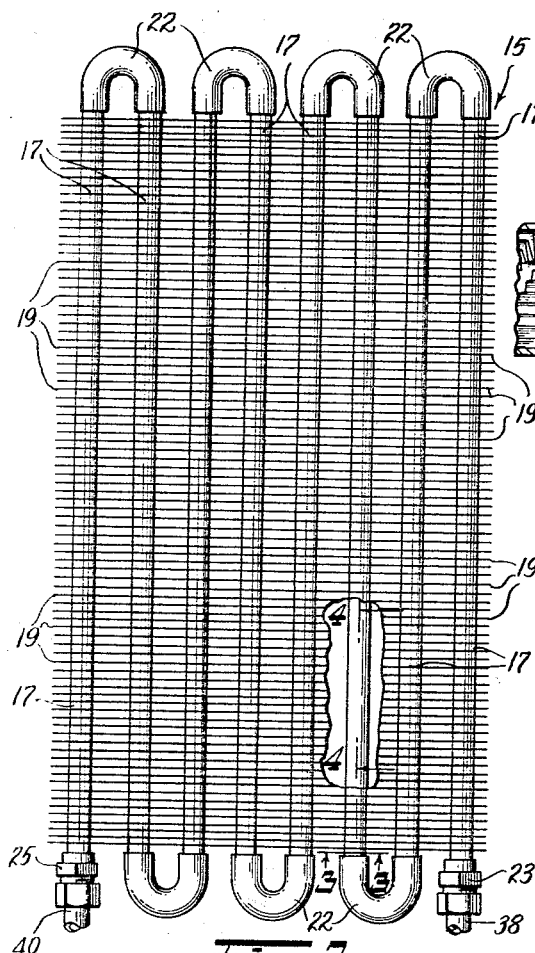
FIG. 2 is an enlarged plan view of the heat exchanger for cooling the oil, taken on line 2—2 of FIG. 1.
Figure 4:
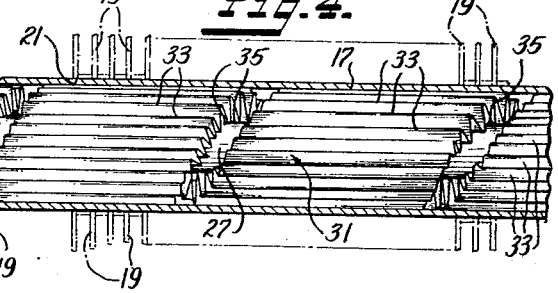
FIG. 4 is an enlarged view, partly in section, of one of the tubes of the heat exchanger taken on line 4—4 of FIG. 2.
Figure 3:
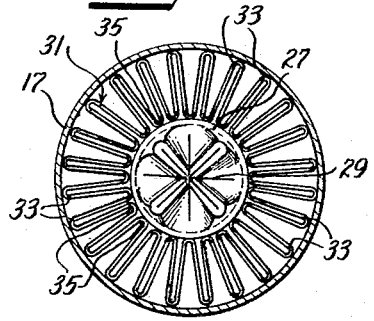
FIG. 3 is an enlarged view of one of the tubes of the heat exchanger taken on line 3—3 of FIG. 2.

In order to achieve satisfactory cooling of the oil in the torque converter, a heat exchanger 15 is employed. Heat exchanger 15 is extremely efficient and provides for rapid cooling of the oil passing therethrough even under extremely adverse conditions. The structure of the heat exchanger 15 is best illustrated in FIGS. 2–4 and includes a series of parallel tubes 17. The tubes 17 are maintained in spaced parallel relationship by means of fins 19. Fins 19 are provided with openings 21 of substantially the same dimension as the outer diameter of tubes 17 in order to provide a contact fit between the fins 19 and the outer surfaces of tubes 17. The ends of tubes 17 at the opposite sides of the heat exchanger 15 are connected together by U-shaped fittings 22 in such a manner that the tubes 17 are arranged for serial flow of a liquid therethrough. Fluid is adapted to enter the heat exchanger 15 through inlet 23 and to be discharged therefrom through outlet connection 25. Each tube 17 of the heat exchanger 15 includes a hollow core member 27 which extends substantially the entire length of tube 17 and which is crimped or sealed close at each end as indicated at 29 against the admission of fluid. The hollow core 27 is maintained spaced from and concentric with the inner wall of tube 17 by means of a sinuous baffle 31. The baffle 31 is formed from thin strip material having high heat-conducting characteristics and is provided with sinuous undulations. The undulations are of such dimension that the sinuous baffle 31 occupies the space between the inner wall of tube 17 and the outer surface of hollow core 27 when the baffle and core are assembled within tube 17. The outer portions 33 of the undulations contact the inner wall of tube 17 while the inner portions 35 of the undulations contact the outer wall of the hollow core member 27. The sinuous baffle member 31 is spirally wound on hollow core member 27 with the undulations extending axially thereof and this assembly is then inserted into tube 17. At this stage of the assembly, the ends of the hollow core member 27 are not sealed. In order to secure the hollow core member and sinuous baffle within tube 17, the hollow core member is expanded to firmly wedge the sinuous baffle between the outer surface of core member 27 and the inner surface of tube 17. The hollow core 27, which is preferably formed of aluminum, copper or some other suitable heat-conducting material, may be expanded by applying mechanical or other pressure to one or both ends of the core and then sealing the ends of the core by crimping or other means in order to prevent fluid from entering the hollow core member. By providing a heat exchanger formed of tubes of the type described, a rapid dissipation of heat of a fluid flowing within tube 17 will be effected. The sinuous baffle member 31 creates a turbulence in the fluid flowing through the tube 17 and this promotes contact of all portions of the fluid flowing therethrough with the inner wall of tube 17. In addition, the heat which is transferred from the fluid to the hollow core member 27 or to the sinuous baffle members 31 will be transmitted to the inner wall of tube 17 by the outer portions 33 of baffle member 31 which contacts the inner wall of tube 17.

As shown in FIG. 1, the heat exchanger 15 for cooling the oil in torque converter 2 is positioned immediately below the radiator 5. The inlet 23 of the heat exchanger 15 is connected to the outlet or high pressure side 37 of the torque converter 2 by means of pipe 38 while the outlet 25 of the heat exchanger 15 is connected to the inlet or low pressure side 39 of the torque converter 2 by means of pipe 40. The oil from the torque converter 2 passing through the heat exchanger 15 from the rear toward the front thereof will be adequately cooled by the air passing over the heat exchanger. When a system of this type is installed in a vehicle, the movement of the vehicle will cause the air to pass over the heat exchanger 15. In addition, the fan 41, which is driven by the engine 1, is disposed adjacent heat exchanger 15 and may be employed to direct air over the heat exchanger. If desired, a casing (not shown) may be arranged between the fan 41 and the heat exchanger 15 in order to confine and direct air circulated by the fan over the heat exchanger.

FIGS. 5–9 illustrate four other embodiments of the invention and serve as examples of the many different forms which the invention may take in practice. The same reference numerals have been employed in these figures to identify identical elements.

In FIG. 5, the heat exchanger 15 is positioned adjacent the lower part of radiator 5 and between the radiator and engine 1. When the heat exchanger is disposed in this posiiton, and connected to the torque converter 2 in the same manner as described in connection with the arrangement illustrated in FIG. 1, the fan 41 tends to circulate more air over the heat exchanger than is the case when the heat exchanger is disposed immediately below radiator 5.

In the modification of FIG. 6, the heat exchanger 15 is disposed in front of and adjacent the upper portion of radiator 5. When the heat exchanger 15 is located in this position, the fins 19 of heat exchanger 15 should be within one-half inch of the front surface of radiator 5 in order to avoid undesirable turbulence of the air passing between heat exchanger 15 and radiator 5. In the event that the fins 19 of heat exchanger 15 are positioned more than one-half inch from the front surface of radiator 5, a shield should be provided extending between heat exchanger 15 and radiator 5 in order to prevent the undesirable turbulence of the air as it passes from heat exchanger 15 to radiator 5. It is desirable to connect heat exchanger 15 to the torque converter 2 in such a manner that the hot oil in pipe 38 enters the inlet 23 in the lower portion of heat exchanger 15 and flows upwardly therethrough to return to the torque converter through outlet 25 and pipe 40.

In the modification illustrated in FIGS. 7 and 8, a system is disclosed for cooling the oil in torque converter 2 by passing the oil through conduit 9 in the lower portion of radiator 5 or through heat exchanger 15. Under some conditions, as in cool weather, it may be desirable to pass the oil from torque converter 2 through the conduit 9 in order to transfer a desired amount of heat from the coolant in radiator 5 to the oil in conduit 9. Under other conditions, it may be desirable to pass the oil from torque converter 2 through heat exchanger 15 in order to rapidly and efficiently cool the oil. In order to control the flow of the oil, a valve 43 of conventional construction is provided, and includes inlet connection 45 and outlet connections 47 and 49. Valve 43 may be actuated to connect inlet 45 with either outlet 47 or outlet 49. The inlet 45 of valve 43 is connected to torque converter outlet 37 by pipe 51. Outlet 47 of valve 43 is connected to the inlet 11 of conduit 9 by pipe 53. Outlet 49 of valve 43 is connected to the inlet 23 of heat exchanger 15 by pipe 55. The outlet 13 of conduit 9 is connected to the inlet of torque converter 2 by means of pipe 57. The outlet 25 of heat exchanger 15 is connected by pipe 59 and pipe T-joint 61 to pipe 57 and thus to the inlet 39 of torque converter 2.

The valve 43 may be automatically operated in response to the temperature of the oil in the torque converter to connect either outlet 47 or outlet 49 to inlet 45. For example, valve 43 may be arranged to connect inlet 45 to outlet 47 when the temperature of the oil is below 160 degrees F. and thus direct the flow of the oil through conduit 9. When the temperature of the oil is above 160 degrees F., the valve 43 is automatically actuated to connect inlet 45 with outlet 49 and thus direct the flow of the oil through heat exchanger 15. If desired, however, valve 43 may be of the type which can be operated manually whenever desired in order to connect either outlet 47 or outlet 49 to inlet 45. It will thus be seen that a system for cooling the oil in a torque converter is provided wherein the oil may either pass through a conduit disposed in the lower part of the conventional radiator or the oil may be directed to pass through a larger and more efficient heat exchanger.

It is also possible to cool the oil by directing the flow thereof through both the heat exchange conduit 9 and the heat exchanger 15 at the same time. Valve 43, in this instance, would be adapted to connect inlet 45 to either outlet 47 or outlet 49 as previously described or to connect inlet 45 to both outlets 47 and 49 at the same time. In this type of system, inlet 45 might be connected to outlet 47 at temperatures of say below 140 degrees F. At temperatures between 140 degrees F. and 180 degrees F., inlet 45 would be connected to both outlets 47 and 49 while at temperatures above 180 degrees F. inlet 45 would be connected to outlet 49.

The modified form of the invention disclosed in FIG. 9 provides another efficient heat-exchange system for cooling the oil in a torque converter. The hot oil from torque converter 2 is adapted to pass first through heat exchanger 15 and then through conduit 9 before being returned to the torque converter. The outlet 37 of torque converter 2 is connected by means of pipe 63 to the inlet 23 of heat exchanger 15 while the outlet 25 of heat exchanger 15 is connected to the inlet 11 of conduit 9 by pipe 65. The outlet 13 of conduit 9 is connected to the inlet 39 of torque converter 2 by pipe 67 and it will thus be seen that the oil from torque converter 2 will pass in series flow, first through heat exchanger 15 and then through heat exchanger conduit 9 before being returned to the torque converter.

Although this invention has been described and illustrated in connection with the operation of a torque converter which is driven by an internal combustion engine, it will be obvious to one skilled in the art that the efficient heat-exchange and circulating system disclosed herein might be employed to cool the oil used in connection with the operation of other devices. The oil employed in connection with the operation of devices such as power steering, transmissions, differentials, fluid clutches and automatic transmissions or the oil employed to lubricate an internal combustion engine may be circulated through the heat exchange conduit 9 and the heat exchanger 15 in the manner described above in connection with the torque converter 2. The invention may be applied to stationary devices as well as those adapted to move on land or water.

It is not intended that the present invention be limited to the various embodiments disclosed herein. Numerous other embodiments are contemplated, and these and other modifications in the structure and the arrangement may be made without departing from the spirit of the invention or the scope of the appended claims.

I claim:

1. A heat-exchange system adapted to cool the oil employed in connection with the operation of an engine driven torque converter, comprising: an engine; a radiator; means connecting said radiator to said engine for circulating coolant from said radiator through said engine; conduit means for cooling said oil positioned within said radiator with the exterior wall of said conduit means being in heat-exchange relationship with said coolant; a torque converter driven by said engine; a heat exchanger for cooling said oil; and means connecting said torque converter with said heat exchanger and with said conduit means for circulating the oil in said torque converter through said heat exchanger and through said conduit means.

2. A heat-exchange system adapted to cool the oil employed in connection with the operation of an engine driven torque converter, comprising: an engine; a radiator; means connecting said radiator to said engine for circulating coolant from said radiator through said engine; conduit means for cooling said oil positioned within said radiator with the exterior wall of said conduit means being in heat-exchange relationship with said coolant; the ends of said conduit extending through the walls of said radiator providing inlet and outlet connections; a torque converter driven by said engine; a heat exchanger having an inlet and an outlet; and means connecting said torque converter with said heat exchanger and with said conduit means for circulating the oil in said torque converter in series flow through said heat exchanger and through said conduit including means connecting said inlet of said heat exchanger to said torque converter; means connecting said outlet of said heat exchanger to said inlet of said conduit means; and means connecting said outlet of said conduit means to said torque converter.

3. A heat-exchange system adapted to cool the oil employed in connection with the operation of an engine driven torque converter, comprising: an engine; a radiator; means connecting said radiator to said engine for circulating coolant from said radiator through said engine; conduit means for cooling said oil positioned within said radiator with the exterior wall of said conduit means being in heat-exchange relationship with said coolant; the ends of said conduit extending through the walls of said radiator forming inlet and outlet connections; a torque converter driven by said engine; a heat exchanger for cooling said oil having an inlet and an outlet; and means connecting said torque converter with said heat exchanger and with said conduit means for circulating the oil in said torque converter in parallel flow through said heat exchanger and through said conduit means including means connecting said torque converter with said inlet of both said heat exchanger and said conduit means; and means connecting said outlet of both said heat exchanger and said conduit means with said torque converter.

4. A heat-exchange system adapted to cool the oil employed in connection with the operation of an engine driven torque converter, comprising: an engine; a radiator; means connecting said radiator to said engine for circulating coolant from said radiator through said engine; conduit means for cooling said oil positioned within said radiator with the exterior wall of said conduit means being in heat-exchange relationship with said coolant; the ends of said conduit extending through the walls of said radiator forming inlet and outlet connections; a torque converter driven by said engine; a heat exchanger for cooling said oil having an inlet and an outlet; a valve actuated in response to a change in temperature having an inlet and first and second outlets; and means for circulating the oil in said torque converter through said heat exchanger and through said conduit including means connecting said valve inlet to said torque converter; means connecting said first valve outlet to said inlet of said conduit means; means connecting said second valve outlet to said inlet of said heat exchanger; and means connecting said outlets of said heat exchanger and said conduit means to said torque converter; said valve being responsive to the temperature of the oil flowing therethorugh to direct said oil from said valve inlet to said first valve outlet when the temperature of said oil is below a predetermined value and to direct said oil from said valve inlet to said second valve outlet when the temperature of said oil is above a predetermined value.

5. A heat-exchange system adapted to cool the oil employed in connection with the operation of an engine driven torque converter, comprising: an engine; a radiator; means connecting said radiator to said engine for circulating coolant from said radiator through said engine; conduit means for cooling said oil positioned with said radiator with the exterior wall of said conduit means being in heat-exchange relationship with said coolant; the ends of said conduit extending through the walls of said radiator forming inlet and outlet connections; a torque converter driven by said engine; a heat exchanger for cooling said oil having an inlet and an outlet; valve means having an inlet and first and second outlets; and means for circulating the oil in said torque converter through said heat exchanger and through said conduit including means connecting said valve inlet to said torque converter; means connecting one of said valve outlets to said inlet of said conduit means; means connecting the other of said valve outlets to said inlet of said heat exchanger; and means connecting said outlets of said heat exchanger and said conduit means to said torque converter; said valve being operable to connect said valve inlet to said first valve outlet or to said second valve outlet.

6. A heat-exchange system adapted to cool the oil employed in connection with the operation of an engine driven torque converter, comprising: an engine; a radiator; means connecting said radiator to said engine for circulating coolant from said radiator through said engine; conduit means for cooling said oil positioned within said radiator with the exterior wall of said conduit means being in heat-exchange relationship with said coolant; the ends of said conduit extending through the walls of said radiator forming inlet and outlet connections; a torque converter driven by said engine; a heat exchanger for cooling said oil having an inlet and an outlet; valve means having an inlet and first and second outlets; and means for circulating the oil in said torque converter through said heat exchanger and through said conduit including means connecting said valve inlet to said torque converter; means connecting one of said valve outlets to said inlet of said conduit means; means connecting the other of said valve outlets to said inlet of said heat exchanger; and means connecting said outlets of said heat exchanger and said conduit means to said torque converter; said valve being operable to connect said valve inlet selectively to only said first valve outlet, to only said second valve outlet or to both said first and second valve outlets simultaneously.

7. A heat-exchange system adapted to cooling the oil employed in connection with the operation of an engine-driven torque converter, comprising: an engine; a radiator; means connecting said radiator to said engine for circulating coolant from said radiator through said engine; conduit means for cooling said oil positioned within said radiator with the exterior wall of said conduit means being in heat-exchange relationship with said coolant; a torque converter driven by said engine; a heat exchanger for cooling said oil consisting of a series of tubes attached in parallel relationship by fin members extending transversely thereof and means connecting the adjacent ends of said tubes on both sides of said heat exchanger in series relationship, each of said tubes comprising an elongated cylindrical body portion, a hollow core of substantially the same length as said tube, each end of said core being closed against the admission of fluid, and thin, spirally wound, strip material formed with sinuous undulations disposed in contact with the inner wall of said body portion and with the outer wall of said core, said undulations extending axially of said tubes; and means connecting said torque converter with said heat exchanger and with said conduit means for circulating the oil in said torque converter through said heat exchanger and through said conduit means, said last named means including a valve operably connected thereto for controlling the flow of the oil therethrough.

References Cited by the Examiner
UNITED STATES PATENTS

| | | | |
|---|---|---|---|
| 2,343,304 | 3/1944 | La Brie | 60—54 X |
| 2,453,877 | 11/1948 | Trail | 60—54 |
| 2,565,816 | 8/1951 | Jones | 257—241 |
| 2,598,538 | 5/1952 | Haynes | 60—53 |
| 2,696,074 | 12/1954 | Dolza | 60—12 |
| 2,714,804 | 8/1955 | O'Leary | 60—54 |
| 2,736,499 | 2/1956 | Hazen | 60—54 X |
| 2,796,239 | 6/1957 | Holmes et al. | 257—245 |
| 3,053,051 | 9/1962 | Kelley | 60—54 |

JULIUS E. WEST, *Primary Examiner.*